United States Patent
Barrett

[19]

[11] Patent Number: 6,134,869
[45] Date of Patent: Oct. 24, 2000

[54] RAKE WITH GRASPING HEADS

[76] Inventor: David Barrett, 610 SW. 6th Ct., Pompano Beach, Fla. 33060

[21] Appl. No.: 09/288,118

[22] Filed: Apr. 8, 1999

[51] Int. Cl.[7] .................................................. A01D 7/10
[52] U.S. Cl. ...................................... 56/400.12; 294/50.6
[58] Field of Search ........................... 56/400.04, 400.07, 56/400.11, 400.12, 400.13, 400.14, 400.16, 400.18; 294/50.6, 50.8

[56] References Cited

U.S. PATENT DOCUMENTS

| | | | |
|---|---|---|---|
| 2,504,943 | 4/1950 | Zifferer | 56/400.12 |
| 3,601,966 | 8/1971 | Kerry | 56/400.12 |
| 4,018,038 | 4/1977 | Sipe | 56/400.12 |
| 4,292,794 | 10/1981 | Gascon | 56/400.12 X |
| 4,378,671 | 4/1983 | Gascon | 56/400.12 |
| 5,303,536 | 4/1994 | Tolliver | 56/400.12 |
| 5,765,351 | 6/1998 | Frankhouser | 56/400.12 |
| 5,901,540 | 5/1999 | Vella | 56/400.12 |

*Primary Examiner*—Robert E. Pezzuto

[57] ABSTRACT

A rake with grasping heads for facilitating the collection of lawn debris. The rake with grasping heads includes an elongate inner rod being disposed in the interior of an outer housing. A first rake head extends from the bottom end of the outer housing and has a plurality of tines. A second rake head is pivotally coupled to a lower portion of the outer housing and has a plurality of uniformly spaced tines. The lower portion of the outer housing is rotatably coupled to the upper portion of the outer housing. The lower portion is rotatable between a first and a second position. The second rake head rotates with the lower portion of the outer housing. The second rake head is positioned behind the first rake head when the lower portion of the outer housing is in the first position. The second rake head faces the first rake head when the lower portion of the outer housing is in the second position. The second rake head is pivotable between an open position and a closed position. The second rake head is spaced apart from the first rake head when the second rake head is in the open position and is positioned towards the first rake head when the second rake head is in the closed position.

18 Claims, 4 Drawing Sheets

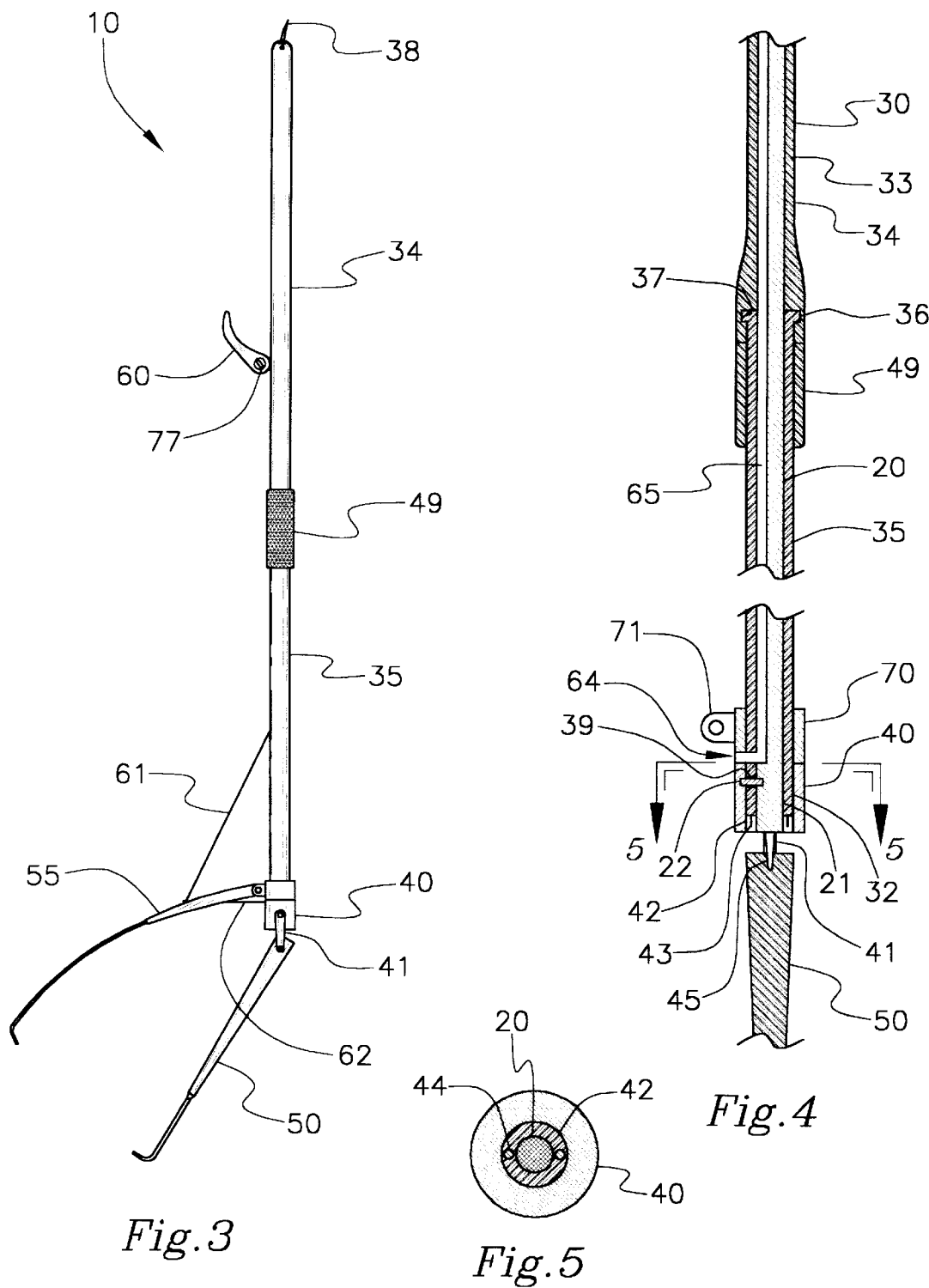

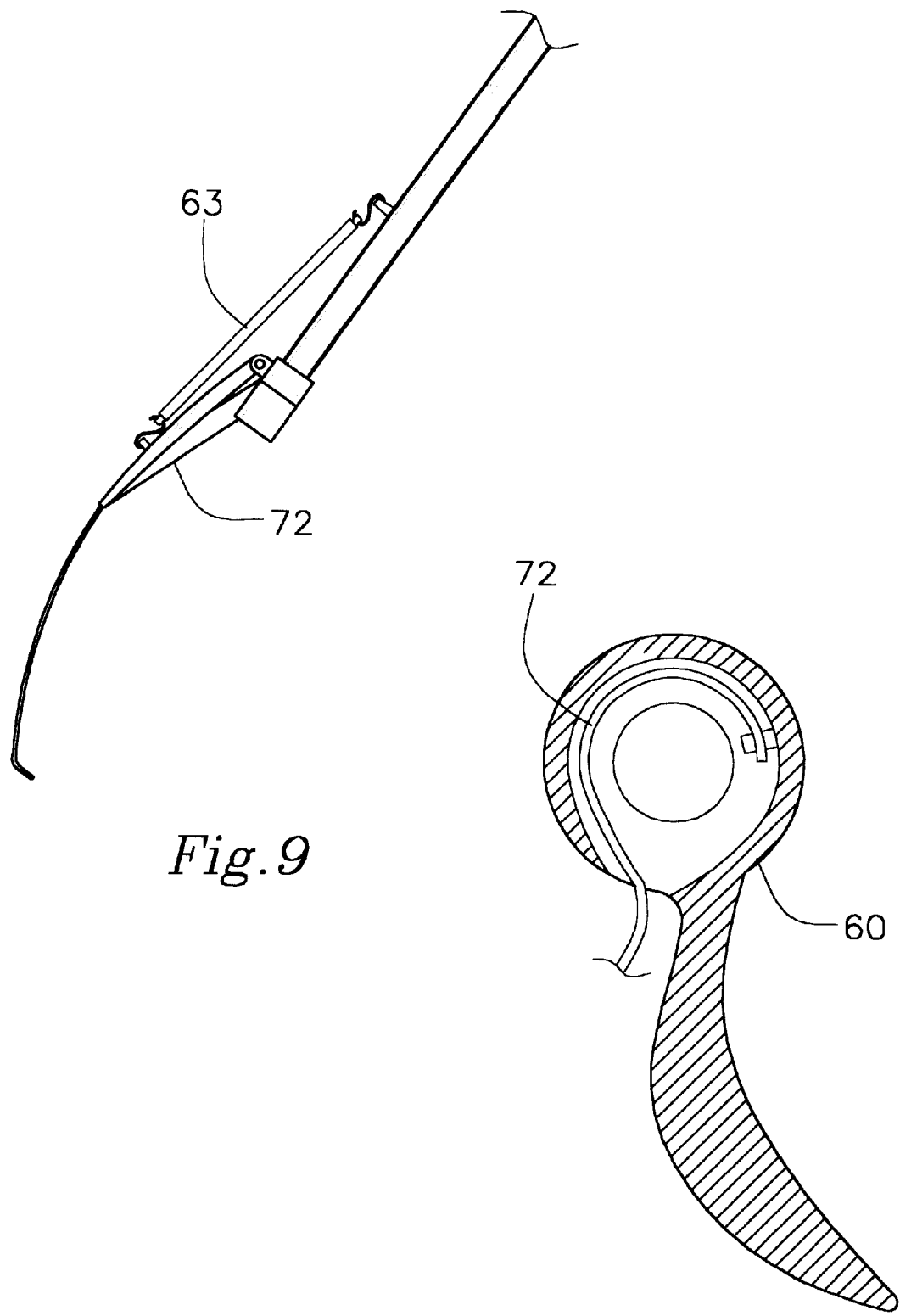

RAKE WITH GRASPING HEADS

BACKGROUND OF THE INVENTION

1. Field of the Invention

The present invention relates to rakes and more particularly pertains to a new rake with grasping heads for facilitating the collection of lawn debris.

2. Description of the Prior Art

The use of rakes is known in the prior art. More specifically, rakes heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,848,074; 5,303,536; 5,058,370; 4,991,386; 4,545,189; and U.S. Pat. No. Des. 359,207.

While these devices fulfill their respective, particular objectives and requirements, the aforementioned patents do not disclose a new rake with grasping heads. The inventive device includes an elongate inner rod being disposed in the interior of an outer housing. A first rake head extends from the bottom end of the outer housing and has a plurality of tines. A second rake head is pivotally coupled to a lower portion of the outer housing and has a plurality of uniformly spaced tines. The lower portion of the outer housing is rotatably coupled to the upper portion of the outer housing. The lower portion is rotatable between a first and a second position. The second rake head rotates with the lower portion of the outer housing. The second rake head is positioned behind the first rake head when the lower portion of the outer housing is in the first position. The second rake head faces the first rake head when the lower portion of the outer housing is in the second position. The second rake head is pivotable between an open position and a closed position. The second rake head is spaced apart from the first rake head when the second rake head is in the open position and is positioned towards the first rake head when the second rake head is in the closed position.

In these respects, the rake with grasping heads according to the present invention substantially departs from the conventional concepts and designs of the prior art, and in so doing provides an apparatus primarily developed for the purpose of facilitating the collection of lawn debris.

SUMMARY OF THE INVENTION

In view of the foregoing disadvantages inherent in the known types of rakes now present in the prior art, the present invention provides a new rake with grasping heads construction wherein the same can be utilized for facilitating the collection of lawn debris.

The general purpose of the present invention, which will be described subsequently in greater detail, is to provide a new rake with grasping heads apparatus and method which has many of the advantages of the rakes mentioned heretofore and many novel features that result in a new rake with grasping heads which is not anticipated, rendered obvious, suggested, or even implied by any of the prior art rakes, either alone or in any combination thereof.

To attain this, the present invention generally comprises an elongate inner rod being disposed in the interior of an outer housing. A first rake head extends from the bottom end of the outer housing and has a plurality of tines. A second rake head is pivotally coupled to a lower portion of the outer housing and has a plurality of uniformly spaced tines. The lower portion of the outer housing is rotatably coupled to the upper portion of the outer housing. The lower portion is rotatable between a first and a second position. The second rake head rotates with the lower portion of the outer housing. The second rake head is positioned behind the first rake head when the lower portion of the outer housing is in the first position. The second rake head faces the first rake head when the lower portion of the outer housing is in the second position. The second rake head is pivotable between an open position and a closed position. The second rake head is spaced apart from the first rake head when the second rake head is in the open position and is positioned towards the first rake head when the second rake head is in the closed position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rake with grasping heads apparatus and method which has many of the advantages of the rakes mentioned heretofore and many novel features that result in a new rake with grasping heads which is not anticipated, rendered obvious, suggested, or even implied by any of the prior art rakes, either alone or in any combination thereof.

It is another object of the present invention to provide a new rake with grasping heads which may be easily and efficiently manufactured and marketed.

It is a further object of the present invention to provide a new rake with grasping heads which is of a durable and reliable construction.

An even further object of the present invention is to provide a new rake with grasping heads which is susceptible of a low cost of manufacture with regard to both materials and labor, and which accordingly is then susceptible of low prices of sale to the consuming public, thereby making such rake with grasping heads economically available to the buying public.

Still yet another object of the present invention is to provide a new rake with grasping heads which provides in the apparatuses and methods of the prior art some of the advantages thereof, while simultaneously overcoming some of the disadvantages normally associated therewith.

Still another object of the present invention is to provide a new rake with grasping heads for facilitating the collection of lawn debris.

Yet another object of the present invention is to provide a new rake with grasping heads which includes an elongate inner rod being disposed in the interior of an outer housing. A first rake head extends from the bottom end of the outer housing and has a plurality of tines. A second rake head is pivotally coupled to a lower portion of the outer housing and has a plurality of uniformly spaced tines. The lower portion of the outer housing is rotatably coupled to the upper portion of the outer housing. The lower portion is rotatable between a first and a second position. The second rake head rotates with the lower portion of the outer housing. The second rake head is positioned behind the first rake head when the lower portion of the outer housing is in the first position. The second rake head faces the first rake head when the lower portion of the outer housing is in the second position. The second rake head is pivotable between an open position and a closed position. The second rake head is spaced apart from the first rake head when the second rake head is in the open position and is positioned towards the first rake head when the second rake head is in the closed position.

Still yet another object of the present invention is to provide a new rake with grasping heads that eases the strain on the back caused by yard work by providing a means for picking up lawn debris without having to bend over.

Even still another object of the present invention is to provide a new rake with grasping heads that has a rotatable clamping jaw that can rest behind the primary raking head so as not to be in the way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic side view of the present invention.

FIG. 4 is a schematic cross-sectional view of the present invention.

FIG. 5 is a schematic cross-sectional view of the present invention taken from Line 5—5 of FIG. 4.

FIG. 10 is a schematic cross sectional view of the lever of present invention.

DESCRIPTION OF THE PREFERRED EMBODIMENT

Figures 1, 2:
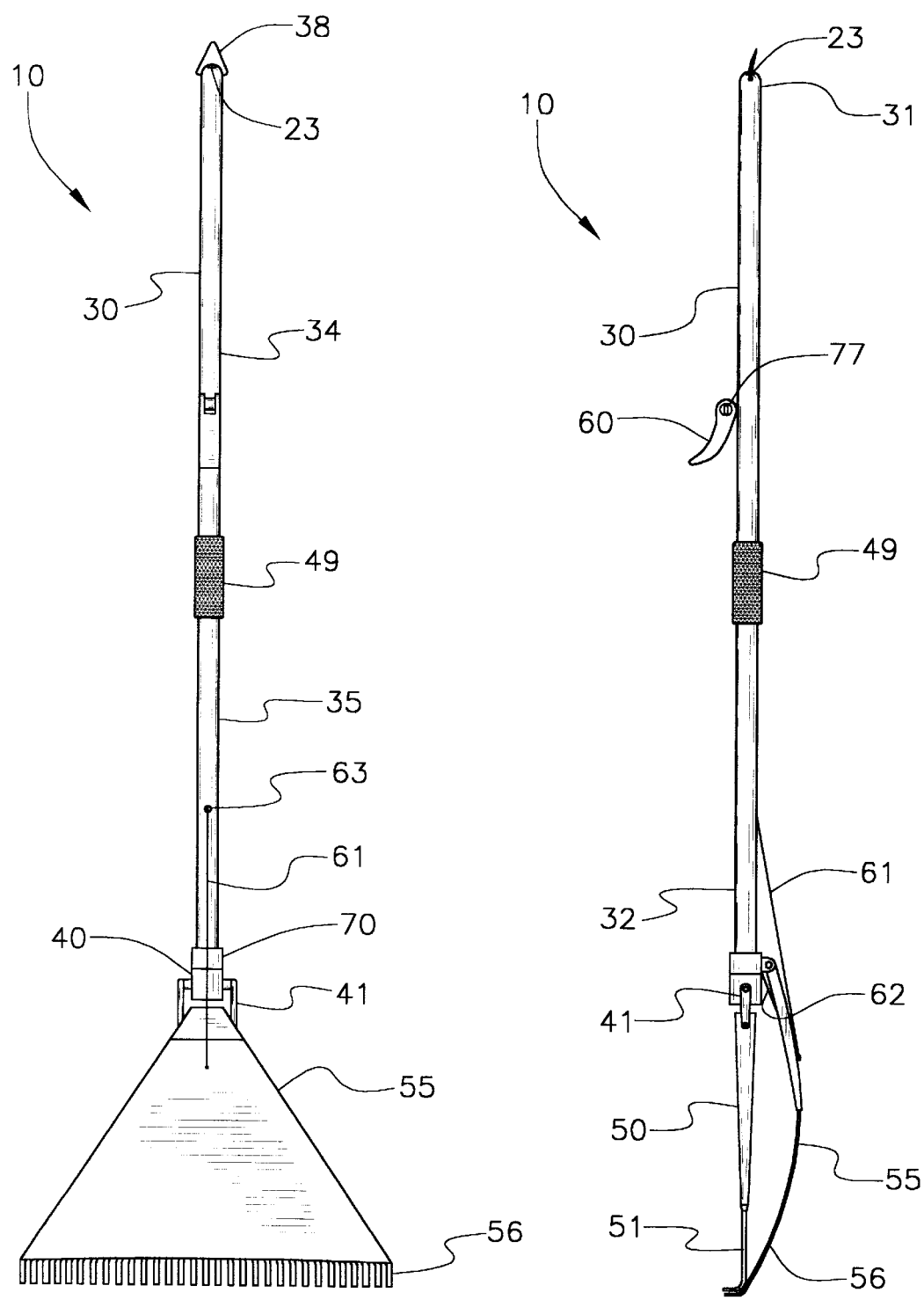
FIG. 1 is a schematic side view of a new rake with grasping heads according to the present invention.
FIGS. 2 and # 9 are a schematic side view of the present invention.

With reference now to the drawings, and in particular to FIGS. 1 through 10 thereof, a new rake with grasping heads embodying the principles and concepts of the present invention and generally designated by the reference numeral 10 will be described.

As best illustrated in FIGS. 1 through 10, the rake with grasping heads 10 generally comprises an elongate inner rod 20 being disposed in the interior of an outer housing 30. A first rake head 50 extends from the bottom end 32 of the outer housing 30 and has a plurality of tines 51. A second rake head 55 is pivotally coupled to a lower portion 35 of the outer housing 30 and has a plurality of uniformly spaced tines 56. The lower portion 35 of the outer housing 30 is rotatably coupled to the upper portion 34 of the outer housing 30. The lower portion 35 is rotatable between a first and a second position such that the second rake head 55 rotates with the lower portion 35 of the outer housing 30. The second rake head 55 is positioned behind the first rake head 50 when the lower portion 35 of the outer housing 30 is in the first position. The second rake head 55 faces the first rake head 50 when the lower portion 35 of the outer housing 30 is in the second position. The second rake head 55 is pivotable between an open position and a closed position. The second rake head 55 is spaced apart from the first rake head 50 when the second rake head 55 is in the open position and is positioned towards the first rake head 50 when the second rake head 55 is in the closed position.

More specifically, the elongate inner rod 20 is generally cylindrical and has upper and lower end (not shown,21). The elongate outer housing 30 is generally cylindrical and has top and bottom ends 31,32, a perimeter sidewall 33 extending between the top and bottom ends 31,32, separable upper and lower portions 34,35, and an interior that is defined by the perimeter sidewall 33. The inner rod 20 is disposed in the interior of the outer housing 30. Preferably, the upper portion 34 of the outer housing 30 is nonrotatably coupled to the inner rod 20 such as by a screw 23 inserted through the top tip of the outer housing 30 and the inner rod 20. Also preferably, the upper portion 34 of the outer housing 30 has a generally triangular-shaped hanging loop 38 that is coupled to it.

Preferably, the lower portion 35 of the outer housing 30 has a lip 36 that outwardly extends around an outer periphery thereof. The upper portion 34 has a lip channel 37 therein which receives the lip 36 of the lower portion 35 to rotatably couple the upper portion 34 of the outer housing 30 to the lower portion 35 of the outer housing 30.

Also preferably, a lower sleeve 40 is disposed around the bottom end 32 of the outer housing 30. The lower sleeve 40 has a pair of opposed arms 41 that extend from it. The first rake head 50 is pivotally coupled to the arms 41 of the lower sleeve 40 and has a plurality of uniformly spaced tines, each of which has an angled end.

Preferably, the lower portion 35 of the outer housing 30 rotates the second head but does not rotate the first rake head 50. To accomplish this, with reference to FIG. 4, the perimeter sidewall 33 of the outer housing 30 has a transverse slot 39 extending therethrough towards the bottom end 32 thereof. The slot forms an arc equal to about one-half the circumference of the perimeter sidewall 33 of the outer housing 30. The lower end 21 of the inner rod 20 has a pin extending from it that slidably extends through the slot of the outer housing 30 and is fixedly coupled to the lower sleeve 40. This permits the outer housing 30 to rotate while the pin holds the lower sleeve 40 stationary and thus keeps the first rake head 50 from rotating.

Also preferably, an upper sleeve 70 is fixedly coupled to the lower portion 35 of the outer housing 30 and is positioned adjacent the lower sleeve 40. Ideally, the upper sleeve 70 has a flange 74 extending from it. The flange 74 has an aperture extending through it.

The second rake head 55 is pivotally coupled to the flange 74 of the upper sleeve 70 and has a plurality of uniformly spaced tines, each of which is generally arcuate along a length thereof for permitting a higher capacity of material to be held between the first and second rake heads 55,56 and has an angled end.

The lower portion 35 of the outer housing 30 rotates between a first and a second position such that the upper sleeve 70 and the second rake head 55 rotate with the lower portion 35 of the outer housing 30. As shown in FIG. 2, the second rake head 55 is positioned behind the first rake head 50 when the lower portion 35 of the outer housing 30 is in the first position. As illustrated in FIG. 3, the second rake head 55 faces the first rake head 50 when the lower portion 35 of the outer housing 30 is in the second position. Ideally, the angle of rotation between the first and second positions is about 180 degrees.

Preferably, the lower portion 35 of the outer housing 30 has a handle portion 49 extending around an upper region thereof to help rotate the lower portion 35 of the outer housing 30. Ideally, the handle portion 49 has a plurality of rubber nubs thereon to provide a better grip.

The second rake head 55 is pivotable between an open position and a closed position. The second rake head 55 is spaced apart from the first rake head 50 when the second rake head 55 is in the open position. The second rake head 55 is positioned towards the first rake head 50 when the second rake head 55 is in the closed position.

The preferred mechanism for positioning the second rake head 55 between the open and closed positions includes a lever 60 that is coupled to the upper portion 34 of the outer housing 30. A spreading cord 61 extends between a back of the second rake head 55 and the lever 60. A clamping cord 62 extends between a face of the second rake head 55 and the lever 60. Actuation of the lever 60 in one direction pulls the spreading cord 61 thereby pulling the second rake head 55 towards the open position. Actuation of the lever 60 in another direction pulls the clamping cord 62 thereby pulling the second rake head 55 towards the closed position.

The preferred means to accomplish this includes a sleeve 73 with elongate teeth 74 radially extending from it. The sleeve is inserted a bore of the handle 60. A toothed cable 75 extends around the sleeve and is coupled to the cords 61 and 62 to open and close the second rake head 55. Pivoting the handle back and forth pulls the toothed cable 75 back and forth. Ideally, a spring 76 is disposed in a bore of the sleeve to bias the rake heads towards the closed position. A locking cap 77 locks the spring 76 in place which in turn locks the second rake head 55 in place. The cap has a lip 78 that engages channels 79 in the bore of the sleeve.

Optionally, the lever 60 may have a single cable 72, as shown in FIGS. 9 and 10, that pulls the second rake head 55 closed. A rubber cable 73 would be used to bias the second rake head 55 open.

Ideally, the outer housing 30 has a spreading cord aperture 63 therethrough. The spreading cord 61 extends through the spreading cord aperture 63. The upper sleeve 70 has a clamping cord aperture 64 through it, through which the clamping cord 62 extends. The inner rod 20 has a cord channel 65 that extends between the upper and lower end (not shown,21) thereof. The spreading and clamping cords 61,62 are disposed in the cord channel 65 of the inner rod 20. Most ideally, the cord channel 65 is positioned midway along the angle of rotation of the lower portion 35 of the outer housing 30 so that the cords move freely therein when the lower portion 35 of the outer housing 30 is rotated.

Figure 6:
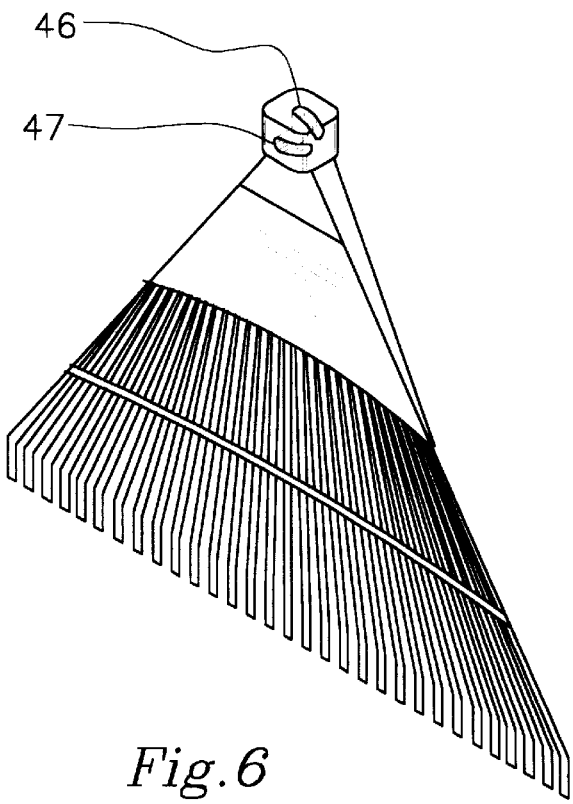
FIG. 6 is a schematic side view of the present invention.
Figure 8:
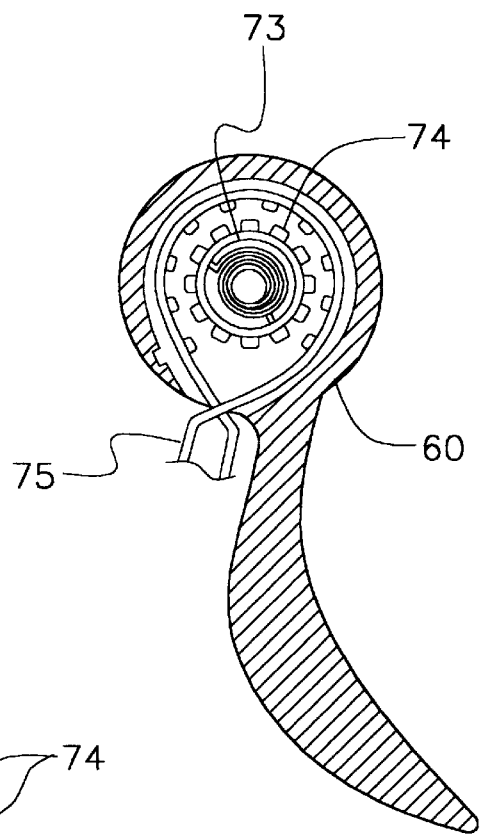
FIG. 8 is a schematic detailed view of the lever of the present invention.
Figure 7:
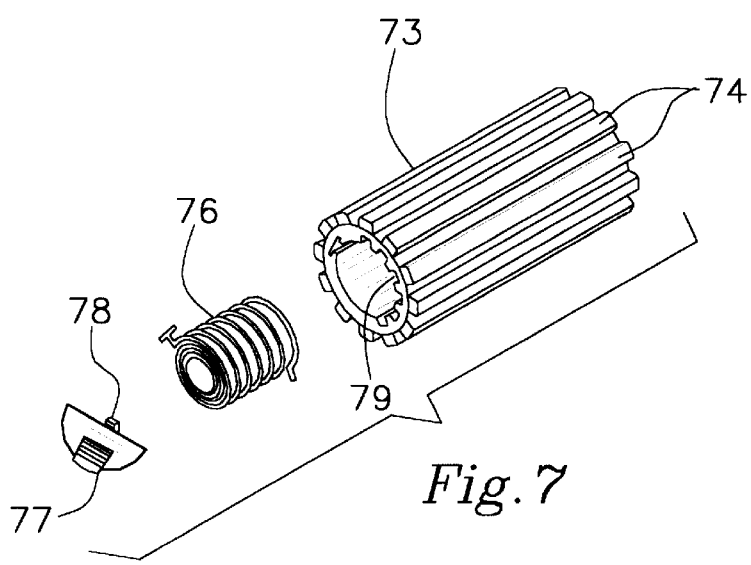
FIG. 7 is a schematic exploded view of the sleeve in the lever of present invention.

Preferably, the first rake head 50 is pivotable between a raking position and a carrying position. The first rake head 50 is generally aligned with a longitudinal axis of the outer housing 30 when the first rake head 50 is in the raking position, as is shown in FIG. 2, and is angled from the longitudinal axis of the outer housing 30 when it is in the carrying position, as is illustrated in FIG. 3. The preferred mechanism for pivoting the first rake head 50 includes a disc portion 42 that is rotatably disposed in the lower sleeve 40. The disc portion 42 is nonrotatably coupled to the bottom end 32 of the outer housing 30, ideally by a pair of pins 43 that extend from the bottom end 32 of the outer housing 30 and through a pair of apertures 44 in the disc portion 42 of the lower sleeve 40. The disc portion 42 has a locking prong 45 that extends from it and that is positioned towards an outer periphery, in other words, off-center of the disc portion 42 such that the locking prong 45 travels in a semicircular path when the disc portion 42 is rotated. As shown in FIG. 6, the first rake head 50 has first and second locking channels 46,47 that receive the locking prong 45 to lock the first rake head 50 between the raking and carrying positions. The first rake head 50 is locked in the raking position when the locking prong 45 is positioned in the first locking channel 46. The first rake head 50 is locked in the carrying position when the locking prong 45 is positioned in the second locking channel 47.

In use, the first rake head 50 is locked in the raking position and the second rake head 55 is positioned behind the first rake head 50, as shown in FIG. 2, to rake something, such as a lawn. To use the rake 10 to carry something such as grass or leaves, the lever 60 is manipulated to move the second rake head 55 into an open position and the handle portion 49 is twisted to rotate the lower portion 35 of the outer housing 30 to position the second rake head 55 such that the second rake head 55 faces the first rake head 50, as shown in FIG. 3. As the lower portion 35 of the outer housing 30 rotates, the locking prong 45 leaves the first locking channel 46, freeing the first rake head 50 and permitting it to pivot between the raking position and the carrying position. The first rake head 50 is placed in the carrying position and the rotation of the lower portion 35 of the outer housing 30 is completed to slide the locking prong 45 into the second locking channel 47 to lock the first rake head 50 in the carrying position. The rake heads are placed over objects such as grass clippings or leaves and the lever 60 is manipulated to move the second rake head 55 from the open position to the closed position to clamp the objects between the rake heads.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rake, comprising:

an elongate inner rod having upper and lower ends;

an elongate outer housing having top and bottom ends, a perimeter sidewall extending between said top and bottom ends, upper and lower portions, and an interior being defined by said perimeter sidewall, said inner rod being disposed in said interior of said outer housing;

a first rake head being extended from said bottom end of said outer housing, said first rake head having a plurality of tines;

a second rake head being pivotally coupled to said lower portion of said outer housing, said second rake head having a plurality of uniformly spaced tines;

said lower portion of said outer housing being rotatably coupled to said upper portion of said outer housing, said lower portion being rotatable between a first and a second position, said second rake head being positioned behind said first rake head when said lower portion of said outer housing is in said first position, said second rake head facing said first rake head when said lower portion of said outer housing is in said second position;

said second rake head being pivotable between an open position and a closed position, said second rake head being spaced apart from said first rake head when said second rake head is in said open position, said second rake head being positioned towards said first rake head when said second rake head is in said closed position;

a lower sleeve being disposed around said bottom end of said outer housing, said lower sleeve having a pair of opposed arms being extended therefrom, said first rake head being pivotally coupled to said arms of said lower sleeve; and wherein said perimeter sidewall of said outer housing has a transverse slot extending therethrough towards said bottom end thereof, said slot forming an arc equal to about one-half the circumference of said perimeter sidewall of said outer housing, said lower end of said inner rod having a pin being extended therefrom, said pin being slidably extended through said slot of said outer housing and being fixedly coupled to said lower sleeve.

2. The rake of claim 1, wherein said lower portion of said outer housing has a lip being outwardly extended around an outer periphery thereof, said upper portion having a lip channel therein for receiving said lip of said lower portion for rotatably coupling said upper portion of said outer housing to said lower portion of said outer housing.

3. The rake of claim 1, wherein said first rake head is pivotable between a raking position and a carrying position, said first rake head being generally aligned with a longitudinal axis of said outer housing when said first rake head is in said raking position, said first rake head being angled from said longitudinal axis of said outer housing when said first rake head is in said carrying position.

4. The rake of claim 3, further comprising a lower sleeve having a disc portion being rotatably disposed therein, said disc portion being nonrotatably coupled to said bottom end of said outer housing, said disc portion having a locking prong being extended therefrom and being positioned towards an outer periphery of said disc portion such that said locking prong travels in a semicircular path when said disc portion is rotated, said first rake head having first and second locking channels for receiving said locking prong for locking said first rake head between said raking and carrying positions, said first rake head being locked in said raking position when said locking prong is positioned in said first locking channel, said first rake head being locked in said carrying position when said locking prong is positioned in said second locking channel.

5. The rake of claim 1, further comprising an upper sleeve being fixedly coupled to said lower portion of said outer housing, said second rake head being pivotally coupled to said upper sleeve.

6. The rake of claim 1, wherein each of said tines of said second rake head is generally arcuate along a length thereof and has an angled end.

7. The rake of claim 1, further comprising a lever being coupled to said upper portion of said outer housing, a spreading cord being extended between said second rake head and said lever, and a clamping cord extending between said second rake head and said lever, wherein actuation of said lever in one direction pulls said spreading cord thereby pulling said second rake head towards said open position, wherein actuation of said lever in another direction pulls said clamping cord thereby pulling said second rake head towards said closed position.

8. The rake of claim 7, wherein said outer housing has a spreading cord aperture therethrough, said spreading cord extending through said spreading cord aperture, said upper sleeve having a clamping cord aperture therethrough, said clamping cord extending through said spreading cord aperture, said inner rod having a cord channel being extended between said upper and lower ends thereof, said spreading and clamping cords being disposed in said cord channel of said inner rod.

9. The rake of claim 1, wherein said lower portion of said outer housing has a handle portion extending around an upper region thereof.

10. A rake, comprising:

an elongate inner rod having upper and lower ends;

an elongate outer housing having top and bottom ends, a perimeter sidewall extending between said top and bottom ends, upper and lower portions, and an interior being defined by said perimeter sidewall, said inner rod being disposed in said interior of said outer housing;

a first rake head being extended from said bottom end of said outer housing, said first rake head having a plurality of tines;

a second rake head being pivotally coupled to said lower portion of said outer housing, said second rake head having a plurality of uniformly spaced tines;

said lower portion of said outer housing being rotatably coupled to said upper portion of said outer housing, said lower portion being rotatable between a first and a second position, said second rake head being positioned behind said first rake head when said lower portion of said outer housing is in said first position, said second rake head facing said first rake head when said lower portion of said outer housing is in said second position;

said second rake head being pivotable between an open position and a closed position, said second rake head being spaced apart from said first rake head when said second rake head is in said open position, said second rake head being positioned towards said first rake head when said second rake head is in said closed position;

wherein said first rake head is pivotable between a raking position and a carrying position, said first rake head being generally aligned with a longitudinal axis of said outer housing when said first rake head is in said raking position, said first rake head being angled from said longitudinal axis of said outer housing when said first rake head is in said carrying position; and further comprising a lower sleeve having a disc portion being rotatably disposed therein, said disc portion being nonrotatably coupled to said bottom end of said outer housing, said disc portion having a locking prong being extended therefrom and being positioned towards an outer periphery of said disc portion such that said locking prong travels in a semicircular path when said disc portion is rotated, said first rake head having first and second locking channels for receiving said locking prong for locking said first rake head between said raking and carrying positions, said first rake head being locked in said raking position when said locking prong is positioned in said first locking channel, said first rake head being locked in said carrying position when said locking prong is positioned in said second locking channel.

11. A rake, comprising:

an elongate inner rod having upper and lower ends;

an elongate outer housing having top and bottom ends, a perimeter sidewall extending between said top and bottom ends, upper and lower portions, and an interior being defined by said perimeter sidewall, said inner rod being disposed in said interior of said outer housing;

a first rake head being extended from said bottom end of said outer housing, said first rake head having a plurality of tines;

a second rake head being pivotally coupled to said lower portion of said outer housing, said second rake head having a plurality of uniformly spaced tines;

said lower portion of said outer housing being rotatably coupled to said upper portion of said outer housing, said lower portion being rotatable between a first and a second position, said second rake head being positioned behind said first rake head when said lower portion of said outer housing is in said first position, said second rake head facing said first rake head when said lower portion of said outer housing is in said second position;

said second rake head being pivotable between an open position and a closed position, said second rake head being spaced apart from said first rake head when said second rake head is in said open position, said second rake head being positioned towards said first rake head when said second rake head is in said closed position; and a lever being coupled to said upper portion of said outer housing, a spreading cord being extended between said second rake head and said lever, and a clamping cord extending between said second rake head and said lever, wherein actuation of said lever in one direction pulls said spreading cord thereby pulling said second rake head towards said open position, wherein actuation of said lever in another direction pulls said clamping cord thereby pulling said second rake head towards said closed position.

12. The rake of claim 11, wherein said first rake head is pivotable between a raking position and a carrying position, said first rake head being generally aligned with a longitudinal axis of said outer housing when said first rake head is in said raking position, said first rake head being angled from said longitudinal axis of said outer housing when said first rake head is in said carrying position.

13. The rake of claim 12, further comprising a lower sleeve having a disc portion being rotatably disposed therein, said disc portion being nonrotatably coupled to said bottom end of said outer housing, said disc portion having a locking prong being extended therefrom and being positioned towards an outer periphery of said disc portion such that said locking prong travels in a semicircular path when said disc portion is rotated, said first rake head having first and second locking channels for receiving said locking prong for locking said first rake head between said raking and carrying positions, said first rake head being locked in said raking position when said locking prong is positioned in said first locking channel, said first rake head being locked in said carrying position when said locking prong is positioned in said second locking channel.

14. The rake of claim 11, wherein said lower portion of said outer housing has a lip being outwardly extended around an outer periphery thereof, said upper portion having a lip channel therein for receiving said lip of said lower portion for rotatably coupling said upper portion of said outer housing to said lower portion of said outer housing.

15. The rake of claim 11, further comprising an upper sleeve being fixedly coupled to said lower portion of said outer housing, said second rake head being pivotally coupled to said upper sleeve.

16. The rake of claim 11, wherein each of said tines of said second rake head is generally arcuate along a length thereof and has an angled end.

17. The rake of claim 11, wherein said outer housing has a spreading cord aperture therethrough, said spreading cord extending through said spreading cord aperture, said upper sleeve having a clamping cord aperture therethrough, said clamping cord extending through said spreading cord aperture, said inner rod having a cord channel being extended between said upper and lower ends thereof, said spreading and clamping cords being disposed in said cord channel of said inner rod.

18. The rake of claim 11, wherein said lower portion of said outer housing has a handle portion extending around an upper region thereof.

* * * * *